Nov. 11, 1969    J. D. DOCKENDORFF ET AL    3,477,829
SODIUM HYDROXIDE MONOHYDRATE CRYSTALLIZATION PROCESS
Filed Feb. 25, 1966
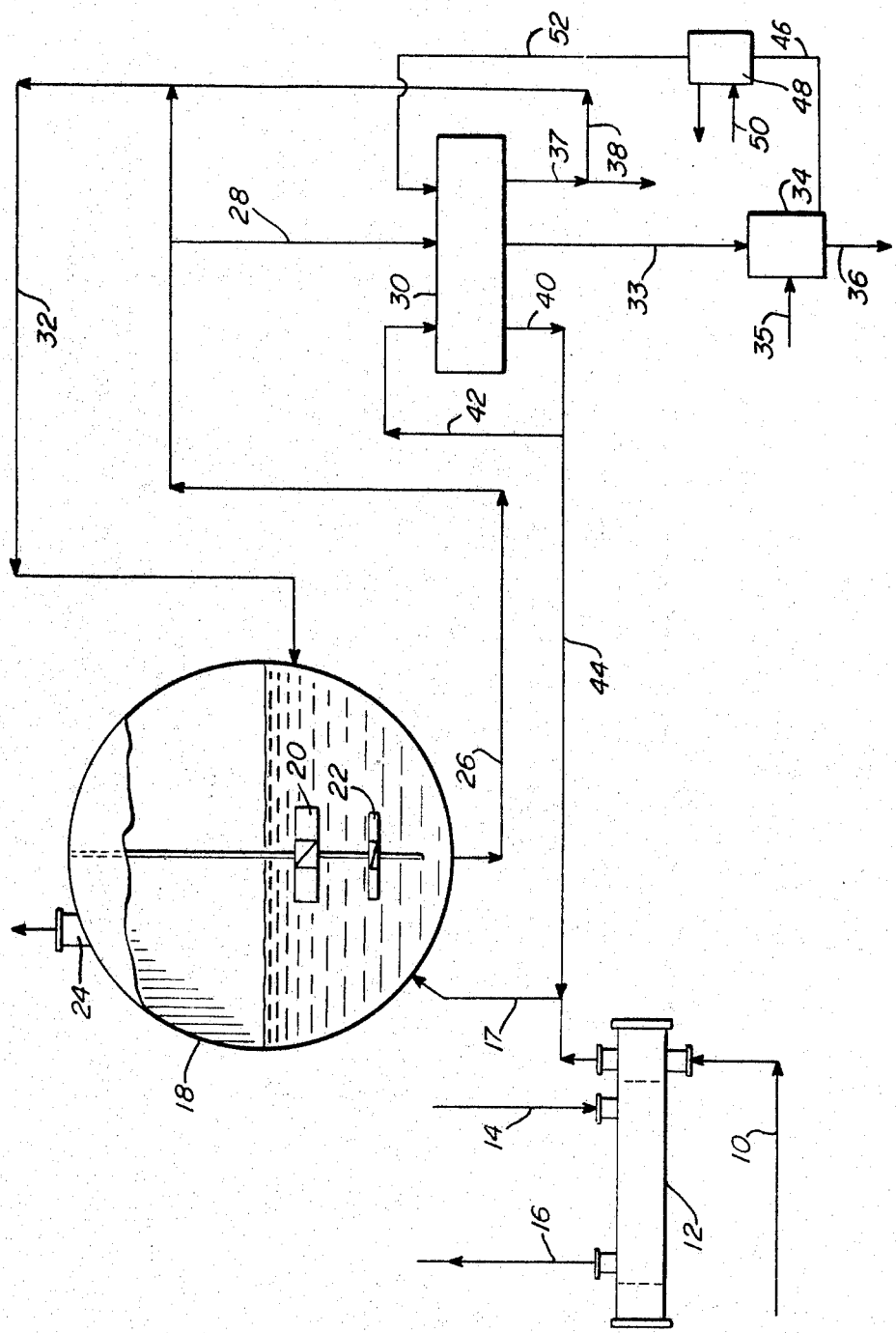
INVENTORS
Jay D. Dockendorff
Anthony N. Chivrico
Bruce P. San Filippo
Merriam, Marshall, Shapiro & Klose
ATTORNEYS United States Patent Office 3,477,829
Patented Nov. 11, 1969

3,477,829
SODIUM HYDROXIDE MONOHYDRATE CRYSTALLIZATION PROCESS
Jay D. Dockendorff, Oak Brook Terrace, Anthony N. Chirico, Naperville, and Bruce P. Sanfilippo, Chicago, Ill., assignors to Chicago Bridge and Iron Company, Oak Brook, Ill., a corporation of Illinois
Filed Feb. 25, 1966, Ser. No. 530,070
Int. Cl. C01d 1/30
U.S. Cl. 23—302                3 Claims

ABSTRACT OF THE DISCLOSURE

A method of purifying sodium hydroxide by adiabatically evaporating water from a solution of caustic under subatmospheric pressure at a temperature between 100 and 140° F. until the solution is supersaturated and crystallization of the purified sodium hydroxide monohydrate occurs.

---

This invention relates to the purification of sodium hydroxide. In its more specific aspect, this invention relates to the purification of sodium hydroxide by crystallization of sodium hydroxide monohydrate from caustic soda solutions containing dissolved impurities.

Caustic soda solutions obtained in commercial processes, such as electrolytic caustic soda, are relatively dilute and impure comprising about 8 to 11% sodium hydroxide and 13 to 17% sodium chloride. These solutions are concentrated and purified by conventional operations, most typically in a multiple effect evaporator system, which usually produce a 50% solution of sodium hydroxide containing about 1 to 1.5% sodium chloride as an impurity. The small quantity of sodium chloride present affects the value and industrial applicability of the product and therefore it is desirable to obtain a still purer product.

According to the present day commercial practice for the purification of sodium hydroxide solutions, hot caustic soda solution of about 50% concentration and containing dissolved impurities such as sodium chloride is cooled to a sufficient temperature to crystallize the sodium hydroxide, and the resulting crystals are separated from the mother liquor. This procedure is particularly disadvantageous in that relatively large cooling surfaces must be employed. Growth of crystals occurs on these cooling surfaces thereby decreasing substantially the efficiency of the operation and further requiring frequent shutdowns of the operation for cleaning and descaling of the equipment.

This invention has as its purpose to provide a method for purifying sodium hydroxide solutions having none of the foregoing disadvantages by providing for the adiabatic cooling of hot caustic feed solution under vacuum conditions. In general, the method of this invention involves introducing hot caustic soda feed solution containing dissolved sodium chloride to a crystallizer vessel maintained under vacuum, preferably at a pressure of 3 to 9 millimeters of mercury absolute. The feed solution introduced to the vessel is agitated sufficiently to maintain continuously good mixing conditions. Under the operating conditions employed, the feed solution will, by means of equilibrium flash vaporization, spontaneously adiabatically cool to the boiling temperature corresponding to the subatmospheric pressure existing in the vessel and will reach equilibrium with respect to the vapor in the crystallizer. The resultant cooling and vaporization of some of the solvent will produce crystallization of sodium hydroxide monohydrate. A suitable outlet means is provided at or near the bottom portion of the crystallizer vessel for removal of magma comprising a slurry of product crystals suspended in the mother liquor. The magma is then treated for the recovery of the product crystals and the separation of the impurity, and the mother liquor may be recirculated for further treatment and use in the process.

In order to describe the invention in greater detail, reference is now made to the accompanying drawing illustrating a preferred embodiment of our invention.

Referring to the drawing, hot caustic feed solution containing dissolved sodium chloride as an impurity is passed from a source (not shown) through line 10 to a suitable heat exchanger 12. In a plant operation for the recovery of relatively pure caustic soda, the caustic soda passed from the multiple effect evaporator system typically is at a relatively high temperature or at least a temperature higher than is required in the crystallization operation of this invention. The function of the heat exchanger 12 is to reduce the temperature of the feed solution, and a suitable heat exchanger might be the shell and tube exchanger, and cooling water is supplied to the shell side of the heat exchanger by a line 14 and is withdrawn through line 16.

The hot feed liquor, which now is at a somewhat reduced temperature because of having passed through the heat exchanger 12, is passed through line 17 to crystallizer vessel 18. These vessels typically are larger capacity units having a diameter of 26 feet and may range from about 25,000 to 60,000 gallons operating retention space producing crystal yields of from 300 to 800 tons per day, although crystallizers of a larger size may be employed.

The solution in the crystallizer is at a temperature of from about 100 to 140° F. and at a mother liquor concentration of from about 55 to 65% sodium hydroxide, and more preferably at a temperature of from 125 to 135° F. and a mother liquor concentration of from about 58 to 61% sodium hydroxide. These operating conditions are particularly desirable in order to achieve a high percentage of crystallization of sodium hydroxide monohydrate under the operating conditions maintained in the crystallizer vessel. The vessel is maintained under a vacuum of from about 3 to 9 millimeters of mercury absolute, and the solution is agitated by means of impellers 20 and 22 to maintain the solution under continuous agitation conditions and to affect intimate admixing. Under these conditions, spontaneous adiabatic cooling occurs thereby resulting in supersaturation of the solution with respect to the sodium hydroxide causing crystallization of sodium hydroxide monohydrate. Vapors generated upon the vaporization of the liquor are withdrawn from the vapor zone of the crystallizer vessel above the liquor through outlet 24 and may be passed to a suitable condensor (not shown).

The crystallizer vessel 18 is provided with an outlet line 26 at the bottom portion thereof for withdrawing magma comprising a slurry of product crystals in mother liquor. The magma is then passed through branch line 28 to a suitable recovery means including a centrifuge 30. Where desired, a portion of the magma is recirculated to the crystallizer vessel by a line 32 so that in the event of a shutdown of any part of the recovery system, it is possible to maintain the crystallizer vessel under continuous operating conditions thereby obviating any freezing in that part of the operation, notwithstanding a shutdown in the recovery system.

The crystals recovered from centrifuge 30 typically have a mesh particle size from about 28 to 60 and are passed through line 33 to dissolver 34. The recovered sodium hydroxide monohydrate crystals at the dissolver are heated to a temperature of about 150° F., as by steam entering through line 35, to melt the crystals thereby resulting in 68% caustic soda solution. This solution is diluted with pure water to about 50%, and then passed through line 36 to storage or to a suitable loading facility for subsequent use.

The mother liquor from centrifuge 30 is withdrawn through line 37, and where desired, a portion or all may be returned to the crystallizer vessel 18 via lines 38 and 32. Also, mother liquor diluted with wash solution withdrawn from the centrifuge through line 40 may be recycled via line 42 to the centrifuge to be used as a first stage wash for the crystals. Liquids from this first stage washing may be returned to the crystallizer vessel via lines 44 and 17. For purposes of a final stage wash to more thoroughly clean the crystals in the centrifuge, a portion of the caustic soda solution in dissolver 34 is passed through line 46 to a dilution tank 48 which is cooled by means of water entering from line 50. The caustic soda solution in tank 48 is diluted with pure water to about the concentration of the mother liquor in the centrifuge, and preferably within about 2% of the mother liquor concentration, for otherwise the crystals in the centrifuge would tend to fuse. The diluted solution is then recycled via line 52 to the centrifuge to serve as a final wash for the crystals.

Under certain operating conditions, depending upon such factors, for example, as concentration, temperature and pressure, sodium chloride crystals may form and precipitate with the sodium hydroxide monohydrate. However, the caustic crystals are relatively more coarse, or, conversely, the sodium chloride crystals are relatively more fine, and these crystals may be selectively separated from each other by known suitable means. For example, after the product is recovered at the centrifuge, the product crystals may be separated from the sodium chloride crystals by means of hydraulic classification, mechanical classification or selective dissolution, or combinations thereof.

In the operaton of the crystallizer system for purifying sodium hydroxide comprising, for example, about 57% sodium hydroxide, 1,000 parts per million sodium chloride, and the balance water, the hot feed liquor, which typically has a temperature of about 260° F., is fed from line 10 to heat exchanger 12. The feed liquor is cooled by indirect heat exchange to a temperature of about 150° F. and passed from line 17 to the crystallizer vessel 18 which is maintained at a temperature of about 130° F. and a pressure of about 4.5 millimeters of mercury absolute. Agitation of the liquor in the vessel is continuously maintained by means of impellers 20 and 22 in order to effect good admixing. The liquor is adiabatically cooled thereby resulting in supersaturation and crystallization of sodium hydroxide monohydrate. The resulting solution in the crystallizer is at a concentration of about 60% sodium hydroxide, and 1,500 p.p.m. sodium chloride. The magma withdrawn through line 26 comprises 30% by weight sodium hydroxide monohydrate crystals. The magma is then passed to the centrifuge 30 for separation of the product crystals from the mother liquor. The recovered crystals are passed to dissolver 34 where they are heated to a temperature of 158° F. to melt the crystals thereby forming a concentrated solution containing only about 10 parts per million sodium chloride. This solution is diluted with pure water to a 50% sodium hydroxide solution which is then passed to storage.

The process of this invention is particularly advantageous in that large cooling surface required in mechanical crystallizers are obviated by employing adiabatic cooling of the hot caustic feed solution. Adiabatic cooling of caustic soda solutions, for the recovery of the monohydrate form of sodium hydroxide is not to be expected in view of the very high boiling point elevation for sodium hydroxide solutions. For this reason, our invention accomplishes an unexpected and unobvious result.

What is claimed is:

1. A method of purifying sodium hydroxide by crystallization thereof from caustic soda solutions containing dissolved impurities which comprises introducing to a crystallizer vessel a hot feed solution containing sodium hydroxide, said vessel maintained under a pressure of 3 to 9 millimeters of mercury absolute and at a temperature of from 100 to 140° F., and the solution in said crystallizer vessel having a mother liquor concentration of about 58 to 61% sodium hydroxide, adiabatically evaporating sufficient water to cause supersaturation of the solution and crystallization of sodium hydroxide monohydrate, withdrawing magma from said crystallizer vessel, separating the withdrawn crystals from the mother liquor, and recovering sodium hydroxide monohydrate crystals, washing said recovered crystals, heating said washed crystals to about 150° F. to form a concentrated solution, diluting a portion of said concentrated solution to within about 2% of said mother liquor concentration to provide a dilute solution for washing said recovered crystals, diluting the balance of said concentrated solution to about 50% sodium hydroxide for storage.

2. A method of purifying sodium hydroxide as described in claim 1, wherein the crystallizer vessel is maintained at a temperature of from 125 to 135° F.

3. A method of purifying sodium hydroxide as described in claim 1 wherein the step of separating the withdrawn crystals from the mother liquor is carried out in a centrifuge.

References Cited

UNITED STATES PATENTS

| | | | |
|---|---|---|---|
| 971,144 | 9/1910 | Reitz | 23—302 |
| 1,806,096 | 5/1931 | Sundstrom et al. | 23—296 |
| 1,865,281 | 6/1932 | Smith | 23—296 |
| 2,112,813 | 3/1938 | Lopey | 23—296 |
| 2,129,464 | 9/1938 | Cunningham | 23—296 |
| 2,178,694 | 1/1938 | Muskat | 23—302 |

NORMAN YUDKOFF, Primary Examiner

U.S. Cl. X.R.

23—185; 203—48